United States Patent
Fernandes et al.

(10) Patent No.: US 8,904,879 B2
(45) Date of Patent: Dec. 9, 2014

(54) VORTEX FLOWMETER HAVING A PRESSURE SENSOR WITH AN OPTICAL FIBER ON THE MEASURING DIAPHRAGM FOR DETECTING DEFLECTIONS

(75) Inventors: Neville C. Fernandes, Pune (IN); Henrik Krisch, Krefeld (DE); Markus Lau, Duisburg (DE); Sylvain Tournillon, Duisburg (DE)

(73) Assignee: KROHNE Messtechnik GmbH, Duisburg (DE)

( * ) Notice: Subject to any disclaimer, the term of this patent is extended or adjusted under 35 U.S.C. 154(b) by 409 days.

(21) Appl. No.: 13/358,935

(22) Filed: Jan. 26, 2012

(65) Prior Publication Data
US 2013/0014591 A1    Jan. 17, 2013

(30) Foreign Application Priority Data
Jul. 11, 2011   (DE) .................. 10 2011 107 547

(51) Int. Cl.
| | |
|---|---|
| G01F 1/32 | (2006.01) |
| G01L 13/00 | (2006.01) |
| G01B 9/02 | (2006.01) |
| G01L 9/00 | (2006.01) |
| G01L 19/06 | (2006.01) |

(52) U.S. Cl.
CPC ........... *G01L 19/0645* (2013.01); *G01L 9/0076* (2013.01); *G01F 1/3263* (2013.01)
USPC ................. 73/861.24; 250/227.14; 356/482

(58) Field of Classification Search
None
See application file for complete search history.

(56) References Cited

U.S. PATENT DOCUMENTS

| | | | |
|---|---|---|---|
| 4,322,978 A | 4/1982 | Fromm | |
| 4,899,046 A * | 2/1990 | Wright et al. | 250/227.14 |
| 5,386,729 A * | 2/1995 | Reed et al. | 73/705 |
| 8,176,790 B2 | 5/2012 | Birch et al. | |
| 8,687,199 B2 * | 4/2014 | Krisch | 356/482 |

FOREIGN PATENT DOCUMENTS

| | | |
|---|---|---|
| DE | 10 2009 039 659 A1 | 3/2011 |
| EP | 0 124 145 A2 | 11/1984 |
| EP | 10 2009 039 659 A1 | 3/2011 |
| JP | 61-47517 A | 3/1986 |

* cited by examiner

*Primary Examiner* — Harshad R Patel
(74) *Attorney, Agent, or Firm* — Roberts Mlotkowski Safran & Cole, P.C.; David S. Safran

(57) ABSTRACT

A vortex flowmeter having a measuring tube through which a medium can flow, a bluff body in the measuring tube and a pressure sensor in the effective range of the bluff body. The pressure sensor has a deflectable measuring diaphragm for determining the pressure in the medium neighboring the measuring diaphragm, at least one optical fiber being arranged on and/or in the measuring diaphragm for detecting the deflection of the measuring diaphragm. The optical fiber is at least partially effectively connected to the measuring diaphragm along its length so that a deflection of the measuring diaphragm caused by the medium pressure leads to an extension and/or compression of the optical fiber. The pressure sensor has a pocket that can be deflected by the pressure of the medium and which surrounds the measuring diaphragm and optical fiber to protect them from the medium. The measuring diaphragm is deflected with the pocket.

12 Claims, 5 Drawing Sheets

VORTEX FLOWMETER HAVING A PRESSURE SENSOR WITH AN OPTICAL FIBER ON THE MEASURING DIAPHRAGM FOR DETECTING DEFLECTIONS

BACKGROUND OF THE INVENTION

1. Field of the Invention

The invention relates to a vortex flowmeter having a measuring tube that can have a medium flowing through it, a bluff body provided in the measuring tube and a pressure sensor provided in the effective range of the bluff body, wherein the pressure sensor has a deflectable measuring diaphragm and the deflection of the measuring diaphragm is used for determining the pressure in the medium neighboring the measuring diaphragm, wherein at least one optical fiber is arranged on and/or in the measuring diaphragm for detecting the deflection of the measuring diaphragm, wherein the optical fiber is at least partially effectively connected to the measuring diaphragm in its course on and/or in the measuring diaphragm, so that a deflection of the measuring diaphragm caused by the medium pressure in the effective connected area leads to an extension and/or compression of the optical fiber. Furthermore, the invention also relates to a pressure sensor for such a vortex flowmeter and a method for producing the pressure sensor.

2. Description of Related Art

Vortex flowmeters have been known for a long time, wherein the measuring principle is based on the fact that vortex streets can be formed in a liquid or gas medium behind a bluff body, around which the medium flows, the vortex street being formed by vortices moving forward with the flow, stripping away from the bluff body. The frequency, at which vortices strip away from the bluff body, is dependent on the velocity of flow, wherein this correlation is nearly linear under certain circumstances. At any rate, the measurement of the vortex frequency is a suitable means for determining the velocity of flow of the medium, which is why a determination of the volume and mass flow is indirectly possible—taking into account additionally, for example, pressure and temperature—using the vortex frequency measurement. Vortices of the medium occurring in a vortex street lead to local pressure fluctuations, which can be detected by pressure sensors. Such a pressure sensor can have an essentially flat measuring diaphragm and has to be arranged in the vortex street so that the vortex created by the bluff body—at least indirectly—passes by the measuring diaphragm of the pressure sensor and can, thus, be detected. Here, the pressure sensor can be provided downstream, behind the bluff body, it can be designed directly in the bluff body or, for example, it can be arranged above the bluff body when the pressure sensor indirectly detects pressure fluctuations of the vortex street, e.g., above channels in the housing of the flowmeter.

Very different methods are known from the prior art for determining the deflection of the measuring diaphragm of the pressure sensor, often capacitive or inductive effects are used and sometimes piezo ceramics are used. It is also known from the prior art to use optical fibers for determining movement of the measuring diaphragm, wherein, here, structures are known in which the optical fibers run practically perpendicularly in front of the measuring diaphragm of the pressure sensor and cast light upon the measuring diaphragm, which is reflected by the measuring diaphragm and is subsequently used for detecting movement. Such vortex flowmeters are also known from the prior art, in which an optical fiber is arranged adjacent to the measuring diaphragm, wherein the optical fiber is deflected with the measuring diaphragm when it is subjected to a pressure or differential pressure with the result that the optical fibers are stretched and/or compressed, i.e., the optical fiber experiences a change in length. Such a change in length can be optically evaluated in a known fashion with great precision, for example, using a known method that is based on the interference of electromagnetic waves. Using this method, it is easily possible to reliably detect changes in length that lie in the range of the wavelengths of the used electromagnetic waves (e.g., see, German Patent Application DE 10 2009 039 659 A1).

In the vortex flowmeters or, respectively pressure sensors for vortex flowmeters known from the prior art having at least one optical fiber arranged on a deflectable measuring diaphragm, it is disadvantageous that the optical fiber and also the measuring diaphragm are directly exposed to the medium so that the optical fiber is subject to corrosion in chemically aggressive media, or respectively, mechanical stress is a threat to the delicate optical fibers and/or the measuring diaphragm when the pressure sensor is located in the measuring tube and, thus in the flowing medium.

SUMMARY OF THE INVENTION

It is, thus, a primary object of the present invention to provide a vortex flowmeter of the above-mentioned type and a pressure sensor for such a vortex flowmeter that can also be used in harsh environmental conditions.

The above object is met initially with a vortex flowmeter and a pressure sensor foaming the basis of the invention in that the pressure sensor has a pocket that can be deflected by the pressure of the medium and the pocket surrounds the measuring diaphragm with the optical fiber, so that the pocket protects the measuring diaphragm from the medium and the measuring diaphragm is deflected together with the pocket.

When it is said that "the measuring diaphragm is deflected together with the pocket", then it is meant that when the pocket is subjected to a pressure, or respectively, a differential pressure, the deflection of the pocket produced also causes a deflection of the measuring diaphragm provided for determining a deflection. The measuring diaphragm surrounded by the pocket is thus mechanically associated with the pocket. Since the pocket surrounds the measuring diaphragm, the flowing medium is prevented from directly contacting the measuring diaphragm and the optical fiber attached to it. As a result, neither the flowing medium comes in direct contact with the optical fiber, nor can particles carried along by the flowing medium come into contact with the optical fiber. The vortex flowmeter according to the invention or the pressure sensor for such a vortex flowmeter according to the invention is thus also suitable for use under harsh process conditions.

In a preferred design of the invention, it is provided that the pocket is filled with an intermediary medium between the pocket and the measuring diaphragm, so that the walls of the pocket can practically be negligibly spaced from the measuring diaphragm and the mechanical association always necessary between the pocket and the measuring diaphragm is still provided. This causes and supports a more direct response of pressure fluctuations in the medium on the measuring diaphragm, wherein, at the same time, production tolerances are not as important as in an implementation without the intermediary medium between the pocket and the measuring diaphragm.

Such intermediary media have been proven to be particularly advantageous that do not yield in a sideways manner—i.e., normal to the direction of deflection—to a deflection of the pocket due to pressure impact, so that the deflection of the pocket is relayed as directly as possible to the measuring diaphragm and is not damped by suppression of the intermediary medium. Many media that comply with these conditions, unfortunately, also stiffen the arrangement of the measuring diaphragm kept in the pocket, so that the sensitivity of the pressure sensor suffers.

In a particularly preferred design of the vortex flowmeter according to the invention or the pressure sensor according to the invention, such media are used as intermediary media that contain powder or consist entirely of such a powder. Surprisingly, it has been seen that such powders are particularly advantageous, whose particles have a particle size that is as uniform as possible, i.e., whose particles show a low as possible variation in particle size. Preferentially, such powders are used that have a particle size in the range of 2 μm to 8 μm, that preferably have a particle size in the range of 4 μm to 6 μm, wherein powders are of particular advantage having a particle size of essentially 5 μm.

Although the intermediary medium between the pocket and the measuring diaphragm make a direct contact between the pocket and the measuring diaphragm deliberately superfluous, the walls of the pocket and the measuring diaphragm are arranged preferably directly adjacent to one another, so that the structure has an overall high sensitivity. This makes it clear that the spaces between the pocket and the measuring diaphragm are preferably extremely small, in the ideal case are only a fraction of a millimeter in the length from diaphragm to diaphragm.

In a preferred design, the intermediary medium is a sediment of the above-mentioned powder, which naturally assumes that the powder is provided in the form of a heterogeneous mixture in a liquid as a suspension and that it settles in the pocket between the pocket and the measuring diaphragm. In another design of the invention, the intermediary medium is obtained using dry separation by settling of the powder in the pocket.

Overall, it is advantageous in a preferred design of the vortex flowmeter or the pressure sensor when the intermediary medium is compacted by centrifuging the powder into the pocket, wherein this can occur using dry separation, preferably however, this occurs by centrifuging of the powder contained in a suspension. In this way, very compact and directly responding intermediary media are obtained between the walls of the pocket and the measuring diaphragm.

In a preferred design of the invention, a vortex flowmeter or pressure sensor that is particularly sensitive to pressure fluctuations, but simultaneously robust is obtained in that the pocket has a first diaphragm and a second diaphragm, i.e., the pocket formed of membranous, thin walls, wherein the first diaphragm and the second diaphragm are connected to one another via a housing into the pocket. Both diaphragms can be thus quasi placed in the housing of the pressure sensor and form a hollow space, in which the measuring diaphragm is placed. In the mounted state of the pressure sensor, the inside of the first diaphragm and the first side of the measuring diaphragm face one another and, likewise, the inside of the second diaphragm and the second side of the measuring diaphragm face one another, so that the first diaphragm and the second diaphragm as well as the measuring diaphragm are all aligned parallel to one another.

In a further design of the vortex flowmeter according to the invention or the pressure sensor according to the invention, a first optical fiber is arranged on one side of the measuring diaphragm and a second optical fiber is arranged on the other side of the measuring diaphragm, wherein each of the optical fibers implements, for example, a measuring path for an interferometric evaluation, i.e., for example, for an interferometric evaluation according to Michelson or Mach-Zehnder. By placing the optical fiber on both sides of the measuring diaphragm, effects in opposite directions on both sides of the measuring diaphragm can be used when the diaphragm is deflected, stretching of one optical fiber on the one side of the measuring diaphragm, compressing of the other optical fiber on the other side of the measuring diaphragm, which generally makes the assembly more sensitive than if only a single fiber were used on one side of the measuring diaphragm.

Preferentially, the first optical fiber and the second optical fiber are chosen having different lengths, so that the working point of the assembly can be set by varying the wavelength of coherent light, in particular, a setting of the point of origin is possible in a non-deflected measuring diaphragm, preferably, the first and second optical fiber are joined to the respective side of the measuring diaphragm via areas of differing length.

The object described above is further met by a method for producing the above-described pressure sensor with a pocket that has an intermediary medium between the pocket and the measuring diaphragm, wherein this intermediary medium contains a powder. The method according to the invention is wherein the powder is suspended in a liquid, in particular in water, and the suspension is centrifuged into the pocket. The pressure sensor is aligned in such a manner here, that the centrifugal force in the pocket is directed so that the suspension fills the pocket under the influence of centrifugal force.

It has been shown to be of particular advantage when the suspension is relatively thin, namely is comprised of more than 90 mass percent of a liquid medium, preferably comprised of even more than 95 mass percent of a liquid medium. It is then guaranteed that the particles of the powder can also overcome the narrow sections of the hollow space in the pocket, for example, in the area of the optical fiber. Suspensions that are particularly suitable are formed of a predefined percentage of water and the rest of magnesium oxide powder or of aluminum oxide powder having a particle size of about 5 μm.

The centrifuging occurs in an advantageous design of the method in such a manner that, compared to the pressure of the surroundings, a positive pressure of about one Bar is created in the pocket, wherein centrifuging continues, in particular, until the pocket is filled with sediment powder. The background for this approach is the consideration that the pressure sensor should function in an optimum manner even with an environmental positive pressure—i.e. relative to the pressure in the pocket—which means such a negative pressure should not lead to the diaphragms rising from the settled powder. Under normal operating conditions, a negative pressure of more than one Bar is not possible, so that higher pressures are not required during centrifuging, similarly higher pressures can be used; it should be taken into consideration that the pressure sensor is not mechanically overloaded, in particular in the area of the pocket. The pressure in the pocket can be set by choosing the number of revolutions and/or the radial expansion of the liquid column over the pocket. The following holds true for the pressure in the pocket during centrifuging $$p_M = \int_{r_1}^{r_2} \omega^2 \cdot \rho \cdot r \, dr = \frac{\omega^2 \cdot \rho}{2}(r_2^2 - r_1^2),$$

wherein $r_1$ and $r_2$ are the limits of radial expansion of the liquid column over the pocket, $\omega$ is the angular velocity of the centrifugal movement and $\rho$ is the density of the medium.

When using the above-mentioned aqueous suspension, centrifuging for about three minutes under the given pressure conditions is sufficient that the suspended powder settles compactly in the pocket. A large portion of the liquid is forced out of the pocket during the sedimentation process, however, the method can be further improved in that the pressure sensor with the centrifuged sediment powder is subjected to a thermal treatment for evaporation of the remaining liquid, wherein heating for several hours at 60° C. to 80° C. has proven successful in conjunction with the above-described, detailed parameters.

In detail, there are a plurality of possibilities for designing and further developing the vortex flowmeter according to the invention and the pressure sensor according to the invention. Here, please refer to the following detailed description of embodiments in conjunction with the accompanying drawings.

DETAILED DESCRIPTION OF THE INVENTION

Figure 1:
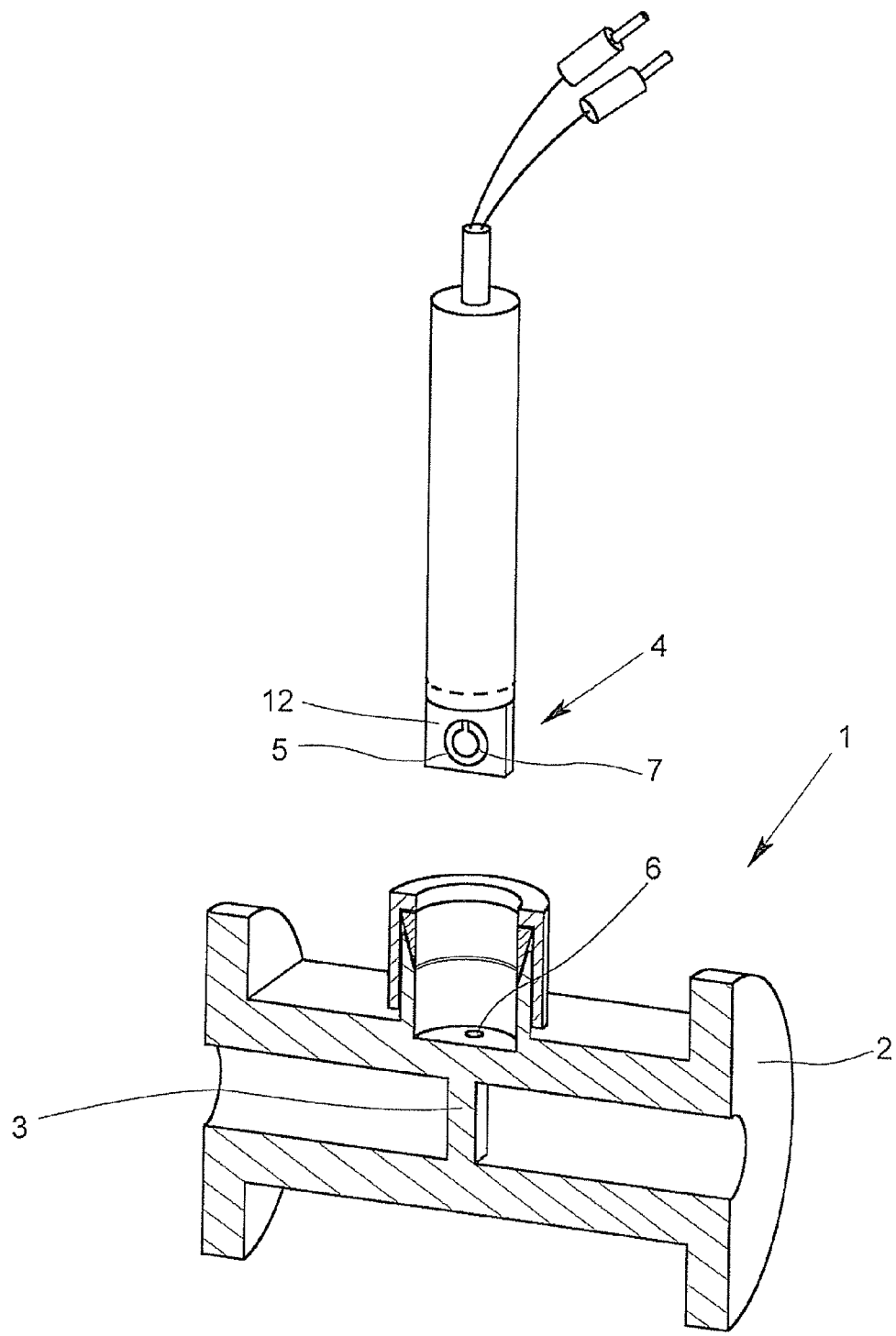
FIG. 1 is a schematic overview of a vortex flowmeter known from the prior art having a pressure sensor, partially in cross section.

FIG. 1 is a sectional view of a vortex flowmeter 1 shown with a measuring tube 2 that can have a medium—not further shown—flowing through it and which has such a medium flowing through it during operation. A bluff body 3 is provided in the measuring tube 2, which creates vortices downstream in the medium when a medium is flowing through the measuring tube 2. The vortices strip away from the bluff body downstream and are carried away by the medium and form a vortex street. The frequency, at which the vortices strip away, is a measure for the velocity of flow within the measuring tube 2. With the exception of the nature of the pressure sensor 4, the structure shown in FIG. 1 is applicable to the present invention.

Furthermore, a pressure sensor 4 is provided in the effective range of the bluff body 3, wherein the pressure sensor 4 has a deflectable measuring diaphragm 5 and the deflection of the measuring diaphragm 5 can be used as a measurement for detecting the pressure in the medium neighboring the measuring diaphragm 5. When it is said that a pressure sensor 4 is provided "in the effective range of the bluff body 3", then it is meant that the pressure sensor 4 is arranged—by means of whatever structure—so that it can determine the vortices caused by the bluff body 3, and thus, the pressure fluctuations caused by these vortices. For this purpose, the pressure sensor 4 can actually be arranged downstream, behind the bluff body, however, the pressure sensor 4 can, as shown in FIG. 1, be arranged essentially above the bluff body 3, wherein the pressure fluctuations caused by the vortices reach the measuring diaphragm through channels 6 provided in the measuring tube 2.

Common in all of the embodiments of the present invention shown is that a optical fiber 7 is arranged on the measuring diaphragm 5 for determining the deflection of the measuring diaphragm 5, wherein the optical fiber 7 is effectively at least partially joined along its length on the measuring diaphragm 5, so that a deflection of the measuring diaphragm 5 caused by the medium pressure in the effective connected area 8 (see, FIG. 3) leads to an extension and/or compression of the optical fiber 7.

It can be further seen in FIG. 1, that the optical fiber 7 is placed directly on the measuring diaphragm 5 in the vortex flowmeter 1 according to the manner of mounting of the prior art, or respectively, in the pressure sensor 4 known from the prior art, and for this reason, comes directly into contact with the medium. In other embodiments, the pressure sensor 4 is not arranged outside of the measuring tube 2 but rather directly behind the bluff body 3 in the medium flow, so that, here, there is a risk of damaging the optical fiber 7 and/or the measuring diaphragm 5.

Figure 2:
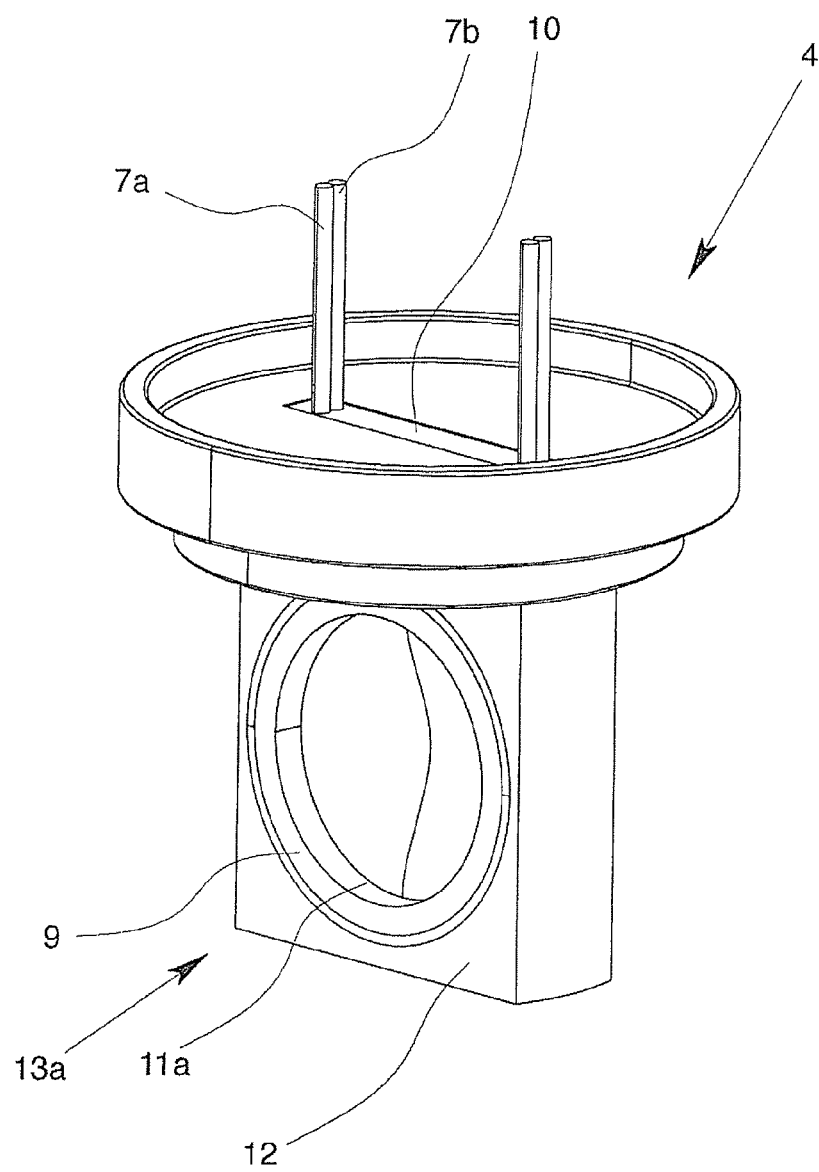
FIG. 2 is perspective view of an embodiment of a pressure sensor according to the invention.
Figure 3:
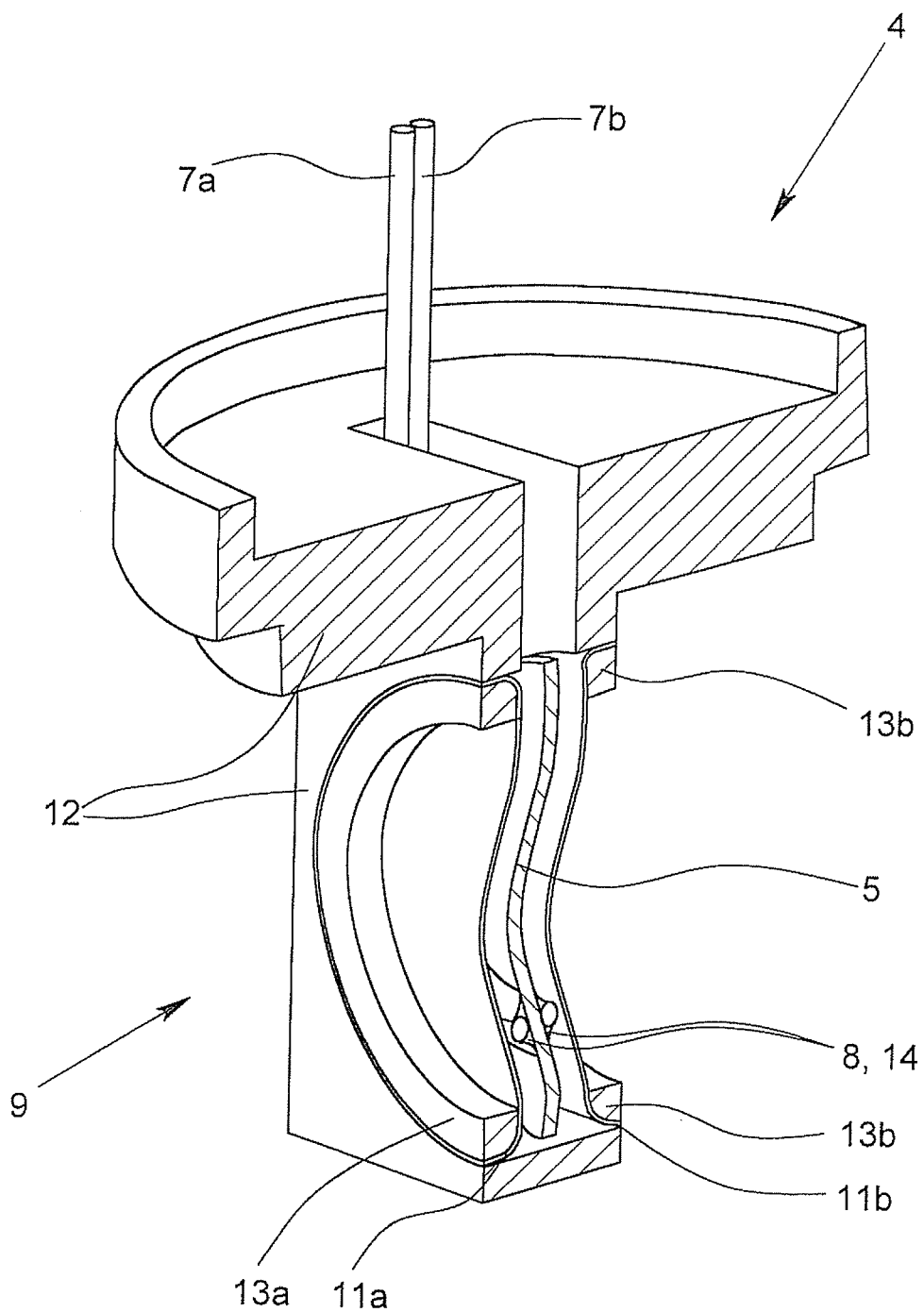
FIG. 3 is a perspective view of the pressure sensor shown in FIG. 2, partially sectioned.
Figure 4:
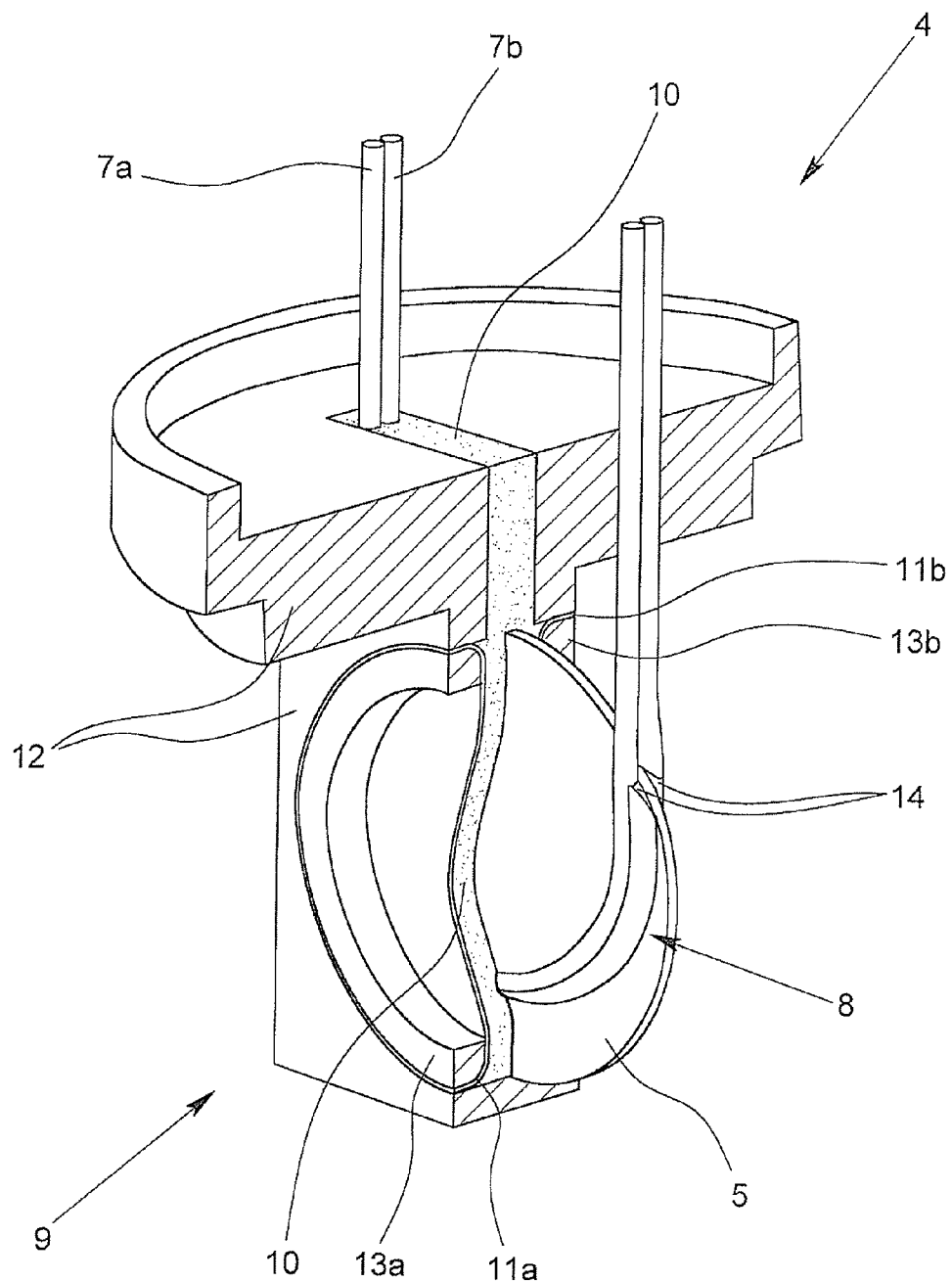
FIG. 4 shows the pressure sensor according to FIG. 3 with a measuring diaphragm and with an intermediary medium.

In FIGS. 2 to 4, a pressure sensor 4 for a vortex flowmeter 1 according to the invention is shown, wherein the figures show different details of the pressure sensor 4.

FIG. 2 clearly shows that the measuring diaphragm 5 is covered, namely is surrounded, by a pocket 9, into which the two optical fibers 7a, 7b extend, and the pocket 9 is also deflectable by the pressure of the medium. The pocket 9 protects the measuring diaphragm 5 together with the optical fibers 7a, 7b from the medium. In FIGS. 2 to 4, the pressure sensor 4, or respectively, the measuring diaphragm 5 is shown in a state under pressure, in which both the pocket 9 and the measuring diaphragm 5 are deflected; in a state in which the measuring diaphragm 5 as well as the pocket 9 not under pressure, they are flat.

It becomes clear in FIGS. 3 and 4, how the measuring diaphragm 5 is placed in the pocket 9 and how it is protectively surrounded by the pocket 9. The optical fibers 7a, 7b extend beyond the pressure sensor 4 and are led further to a interferometric evaluating unit (not shown).

It can be seen in FIGS. 2 and 4 that the space between the pocket 9 and the measuring diaphragm 5 is filled with an intermediary medium 10, which makes an extensive, direct interaction between the pocket 9 and the measuring diaphragm 5 possible. The intermediary medium 10 is comprised nearly entirely of a powder that has a particle size of essentially 5 μm, with only few deviations of smaller or larger particles. It has been found by the inventors that powders having a particle size as uniform as possible are particularly capable of flow and reliably fill spaces between the measuring diaphragm 5 and the pocket 9, in particular when they—as in the shown embodiment—are suspended in a liquid as a thin suspension and centrifuged into the pocket 9. The medium 10 obtained in this manner is, thus, practically entirely sediment that has a solid, pressure and deflection intermediary consistency and is not forced to the side by deflection of the pocket 9 so that it rather reliably conveys the deflection to the measuring diaphragm 5.

It can be easily seen in FIGS. 3 and 4, that the pocket 9 is bounded on opposite sides by a first thin diaphragm 11a and second thin diaphragm 11b, the first diaphragm 11a and the second diaphragm 11b being joined to one another via a housing 12 of the pressure sensor 4 to form the pocket 9. In the joined state of these elements of the pocket 9, the inside of the first diaphragm 11a and the first side of the measuring diaphragm 5 face one another as do the inside of the second diaphragm 11b and the opposite second side of the measuring diaphragm 5.

The diaphragms 11a, 11b presently are formed of stainless steel, as is the housing 12 of the pressure sensor 4, and have a wall thickness of 50 μm. The wall thickness of the diaphragms 11a, 11b and the measuring diaphragm 5 are not shown to scale, but rather are shown with more emphasis for clarifying the construction; the same is true for the optical fibers 7a, 7b.

The diaphragms 11a, 11b are pressed into the housing 12 using ring elements 13a, 13b, wherein the outward transition between the ring elements 13a, 13b, the diaphragms 11a, 11b and the housing 12 can be welded in order to increase the seal.

In other embodiments, not shown here, the pocket 9 is integrally formed in and with the housing 12 of the pressure sensor 4, in that the hollow space in the pocket is produced using electrochemical corrosion or spark erosion.

Figure 5:
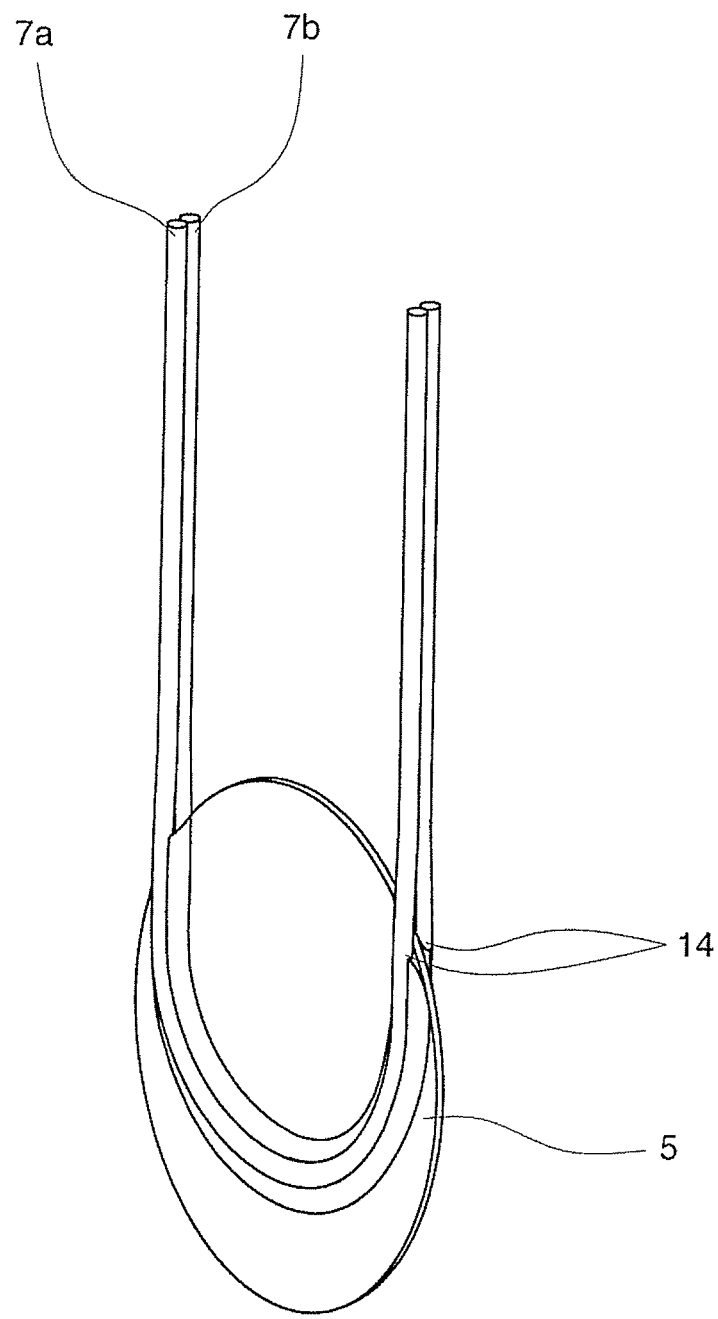
FIG. 5 is a perspective view of measuring diaphragm with optical fibers attached and arranged thereon.

The optical fibers 7a, 7b are metallized in the area, in which they are joined to the measuring diaphragm 5, in the present case, with copper, wherein the measuring diaphragm 5 is also produced using copper and the optical fibers 7a, 7b are joined with the measuring diaphragm 5 using solder joints 14 (FIG. 5).

The pressure sensor 4 shown in FIGS. 2 to 4 is produced by a suspension of 95 percent by mass of water and 5 percent by mass of aluminum oxide powder ($Al_2O_3$) having a particle size of about 5 μm being centrifuged for several minutes at a positive pressure of about one Bar, so that a compact sediment of the aluminum oxide particles can be formed in the pocket 9. Subsequently, the remaining moisture is practically completely removed by subjecting the pressure sensor 4 to a thermal treatment for several hours.

What is claimed is:

1. Vortex flowmeter, comprising:
a measuring tube through which a medium is flowable,
a bluff body provided in the measuring tube and
a pressure sensor provided in an effective range of the bluff body,
wherein the pressure sensor has a deflectable measuring diaphragm for determining the pressure in an intermediate medium near the measuring diaphragm,
wherein at least one optical fiber is at least partially effectively connected to the measuring diaphragm along its length so that a deflection of the measuring diaphragm caused by a medium flowing through the measuring tube leads to an extension or compression of the optical fiber,
wherein the pressure sensor has a pocket that is deflectable by the medium flowing through the measuring tube, the measuring diaphragm with the optical fiber connected thereto being located in the pocket in a manner such that the pocket protects the measuring diaphragm from the medium and causes the measuring diaphragm to be deflected together with the pocket.

2. Vortex flowmeter according to claim 1, wherein the intermediary medium fills spaces between the pocket and the measuring diaphragm.

3. Vortex flowmeter according to claim 2, wherein the intermediary medium contains a powder with a particle size in the range of 2 μm to 8 μm.

4. Vortex flowmeter according to claim 3, wherein the powder is in the form of sediment.

5. Vortex flowmeter according to claim 2, wherein the intermediary medium contains a powder with a particle size of essentially 5 μm.

6. Vortex flowmeter claim 1, wherein the pocket comprises a first diaphragm and a second diaphragm, wherein the first diaphragm and the second diaphragm are connected to one another via a housing of the pressure sensor to form the pocket, wherein an inner side of the first diaphragm and a first side of the measuring diaphragm face each other and wherein an inner side of the second diaphragm and a second side of the measuring diaphragm face each other.

7. Vortex flowmeter according to claim 6, wherein the diaphragms are made of stainless steel having a wall thickness of 40 μm to 60 μm.

8. Vortex flowmeter according to claim 6, wherein the diaphragms are made of stainless steel having a wall thickness of 50 μm.

9. Vortex flowmeter claim 1, wherein the optical fiber is metallized in an area of the connection to the measuring diaphragm by the metal or the alloy of which the measuring diaphragm is made from.

10. Vortex flowmeter claim 9, wherein the measuring diaphragm and the metallization of the optical fiber comprise a metal selected from the group consisting of copper, bronze and stainless steel.

11. Vortex flowmeter claim 1, wherein said at least one optical fiber comprises a first optical fiber arranged on a first side of the measuring diaphragm, and a second optical fiber arranged on an opposite second side of the measuring diaphragm.

12. Vortex flowmeter claim 11, wherein the first optical fiber and the second optical fiber have different lengths and are connected to the measuring diaphragm with connecting sections of different lengths.

* * * * *